May 15, 1962 J. J. CHYLE 3,035,152
METHOD OF ARC WELDING USING CARBON DIOXIDE AS A SHIELDING MEDIUM
Filed Oct. 7, 1954
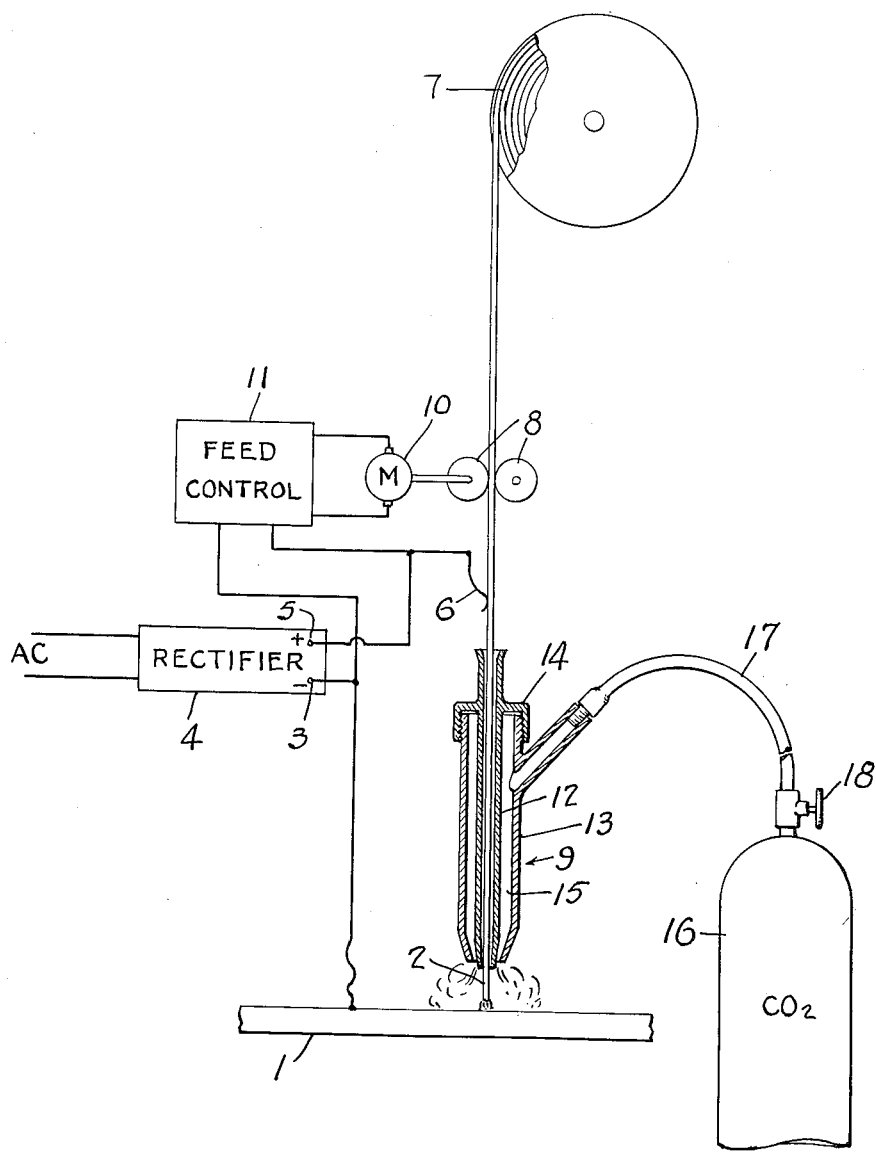
INVENTOR.
John J. Chyle
BY Andrus & Scales
ATTORNEYS.

3,035,152
METHOD OF ARC WELDING USING CARBON DIOXIDE AS A SHIELDING MEDIUM
John J. Chyle, Wauwatosa, Wis., assignor to A. O. Smith Corporation, Milwaukee, Wis., a corporation of New York
Filed Oct. 7, 1954, Ser. No. 460,944
5 Claims. (Cl. 219—74)

This invention relates to a method of arc welding and particularly to an arc welding method wherein the arc is maintained in an atmosphere of shielding gas.

Arc welding in an atmosphere of a non-oxidizing gas with either a consumable electrode or a non-consumable electrode is known in the welding art. An inert gas such as helium, argon or a mixture of the two has been extensively employed. When a consumable electrode is employed, the work and electrode are generally connected with reverse polarity, i.e. the work is connected to the negative isde of the welding current source and the electrode is connected to the positive side of the welding current source. The above arrangement permits an extremely rapid feed of the electrode toward the work. Although the above method of welding provides sound welds, helium and argon are relatively scarce and are expensive gases.

It has been suggested in the prior art to use a less costly gas such as carbon dioxide as a shielding medium, but attempts to employ carbon dioxide have not met with success. For example, the patent to Alexander No. 1,746,207 speaks of welding in an atmosphere of carbon dioxide and concludes that in every case the welds were brittle and not as good as welds made in air. Similarly the paper, "Studies on Electric Welding" by Ludwig J. Weber from the Transactions of the American Society for Steel Treating presented September 20, 1926, discloses that welds made in a carbon dioxide atmosphere are not satisfactory due to the oxidation of the iron.

The patents to Lincoln Nos. 1,589,017 and 1,711,151 disclose the use of an inert gas, such as carbon dioxide or nitrogen, with a low amperage, nonconsumable carbon electrode system, but this method has never proven successful in commercial practice.

In some cases small amounts of carbon dioxide have been used in combination with other gases, such as argon, helium or carbon monoxide, to provide a gaseous shield that produced favorable results. However, the use of carbon dioxide alone as a shielding gas has never provided acceptable results, and it is believed that this failure to achieve sound welds with carbon dioxide is due to the fact that under normal welding conditions the carbon dioxide produces a globular-type of metal transfer, in contrast to the desired spray-type metal transfer.

The present invention is based on the discovery that sound welds can be produced with a shielding gas consisting solely of carbon dioxide when using a killed steel consumable electrode by controlling the speed of the electrode feed and the current density within predetermined limits.

According to the invention the electrode is fed at a speed in the range of 200 to 600 inches per minute and the current density is maintained at a value of over 85,000 amperes per square inch. This current density is extremely high as compared to a current density of about 4,000 amperes per square inch normally used in hand arc welding or to a current density of about 30,000 amperes per square inch normally employed in submerged arc welding.

With this high rate of electrode feed and the high current density it is possible to obtain a spray-type arc characteristic heretofore unattainable when using carbon dioxide as a shielding medium and thus produce sound uniform welds.

The drawing furnished herewith illustrates the best mode presently contemplated for carrying out the invention.

Referring to the drawing, there is shown a workpiece 1 to be welded by striking an arc between the workpiece 1 and a consumable, killed steel electrode 2 which may be in wire or rod shape. As shown in the drawing, reverse polarity arc welding is employed with the workpiece 1 connected to the negative terminal 3 of a source of direct current shown as a rectifier 4 and the electrode 2 connected to the positive terminal 5 of the rectifier 4. The connection of the electrode 2 to the electric circuit is by a sliding contact 6 to allow movement of the consumable electrode. As the welding progresses, the portion of the electrode adjacent the workpiece is burned off and transferred to the workpiece 1.

To maintain a predetermined arc length between the electrode and the work, the electrode 2 is continuously drawn from a reel 7 by feed rollers 8 and fed through a welding head 9 toward the workpiece 1. The feed rollers 8 are variably driven by a motor 10 in accordance with the arc length as hereinafter described. The arc length is maintained practically constant by connecting the arc voltage as a voltage source to an electrode feed control 11 connected to the feed motor 10. If the arc voltage fluctuates, the feed control 11 varies the speed of the feed motor to return the arc length to normal. For example, if the arc length increases above normal, the arc voltage increases and this increased voltage is applied to the feed motor so as to increase the feed of the electrode 2 to the work. Conversely, a decrease in arc length and therefore arc voltage results in a reduction of the feed of electrode 3 and a lengthening of the arc length until a normal arc is obtained. This is a conventional variable electrode feed arrangement and the feed control 11 is therefore shown in diagrammatic form.

The welding head 9 is constructed with concentric cylinders 12 and 13 with the wire electrode 2 passing through the central cylinder 12. The top of the outer cylinder 13 is sealed to the inner cylinder 12 by a cap 14 welded to the outer surface of the cylinder 12 and is threaded onto the outer cylinder 13 to provide an annular passage 15 between the cylinders 12 and 13. To introduce carbon dioxide about the welding arc, a source 16 of carbon dioxide is connected to the passage 15 by a tube 17. A valve 18 in the tube 17 is employed to regulate the flow of gas to the passage 15. The carbon dioxide passes through passage 15 and is discharged concentrically of the electrode to envelope the arc and thereby protect the welding zone from the surrounding atmosphere.

In order to obtain a spray-type of metal transfer from the electrode 2 to the workpiece a high current density is employed. Generally, the lower limit of the current density should be that minimum amount which will produce a spray-type metal transfer and the upper limit of the current density should be that maximum amount which can be put into the electrode 2 without exploding the rod. More specifically, the current density should be at least 85,000 amperes per square inch, and for usual operations a current density of 120,000 to 200,000 amperes per square inch has proven very satisfactory.

In combination with the high current density, the speed of the electrode feed toward the workpiece should be in the range of 200 to 600 inches per minute. A feed of about 375 inches per minute has proven very satisfactory. The rate of electrode feed will normally result in travel of the welding head along the seam to be welded at about 8 to 150 inches per minute depending on the nature of the articles to be welded.

The rate of flow of carbon dioxide should be sufficient to continually purge the atmosphere at the region surrounding the arc. For most operations and electrode diameters the rate of flow of carbon dioxide should be between 15 and 50 cubic feet per hour, and generally between 20 and 35 cubic feet per hour is most satisfactory. This rate of flow of carbon dioxide is substantially less than the rate of flow of argon or helium which would be necessary with a corresponding electrode feed and welding amperage.

It has been found that the rate of flow of carbon dioxide should be maintained below a certain level on the nozzle opening, or the welding head may freeze. If the rate of flow of the carbon dioxide is maintained below 50 cubic feet per hour this danger will ordinarily be eliminated.

A typical example employing the present invention as applied to the welding of I-beam sections of an automotive frame are as follows:

| | |
|---|---|
| Stock composition | SAE 1008 Steel. |
| Stock thickness | .063 to .094 inch. |
| Type of weld | Fillet. |
| Electrode size | 1/16 inch diameter. |
| Electrode composition: | |
|    Carbon | 0.15%. |
|    Manganese | 1.05%. |
|    Phosphorus | 0.011%. |
|    Sulphur | 0.028%. |
|    Silicon | 0.22%. |
|    Iron | Balance. |
| Speed of electrode feed | 220 inches/minute. |
| Speed of travel of electrode | 105 inches/minute. |
| Arc voltage | 30 volts. |
| Arc amperage | 420 amperes. |
| Current density | 140,000 amperes/square inch. |
| Polarity | Reverse. |
| Rate of flow of $CO_2$ | 20 cubic feet/hour. |

This procedure resulted in a sound uniform weld, free of pits, inclusions and other defects.

While the above description is directed to the use of reverse polarity in the welding operation, it is contemplated that under certain conditions straight polarity can also be employed. For example, if it is desirable to have a smooth action with minimum spatter then reverse polarity should be used, but if spatter is not objectionable, then straight polarity can also be used.

Similarly, the use of direct current is not essential. In some instances it may be desirable to employ alternating current and the results obtainable with alternating current are acceptable.

The present invention provides a method of using the inexpensive gas, carbon dioxide, as a shielding medium in arc welding. The successful use of carbon dioxide as a shield for killed steel, consumable electrodes is obtained by virtue of the high current density and high rate of electrode feed maintained during the welding operation.

Various modes of carrying out the invention are contemplated as within the scope of the following claims particularly pointing out and distinctly claiming the subject matter which is regarded as the invention.

I claim:

1. In a method of arc welding wherein the workpiece to be welded constitutes one electrode and a killed steel consumable rod constitutes the other electrode, the steps which comprise striking an arc between the electrodes, feeding the consumable electrode toward the work at a speed of from 200 to 600 inches per minute, maintaining a gaseous shield consisting of carbon dioxide about the arc to exclude the surrounding atmosphere therefrom, and applying a current density to the rod in an amount sufficient to produce a spray-type of metal transfer from the rod to the workpiece.

2. A method of arc welding wherein an arc is maintained between the workpiece as one electrode and a killed steel consumable weld rod as the second electrode, which comprises striking an arc between the electrodes, maintaining a gaseous cover consisting of carbon dioxide about the arc to exclude the surrounding atmosphere, and maintaining a current density of above 85,000 amperes per square inch in the rod to produce a spray-type of metal transfer from the rod to the workpiece and thereby obtain a sound uniform weld.

3. A method of arc welding wherein an arc is maintained between the workpiece as one electrode and a killed steel consumable weld rod as the second electrode, which comprises striking an arc between the electrodes with reverse polarity, feeding the weld rod toward the work at a speed sufficient to maintain a substantially constant arc length, maintaining a flow of a gas consisting solely of carbon dioxide about the arc to exclude the surrounding atmosphere from the arc, and maintaining a current density in the rod of about 120,000 to 200,000 amperes per square inch to produce a spray-type of metal transfer from the rod to the workpiece.

4. A method of arc welding, which comprises striking an arc between a workpiece and a killed steel consumable weld rod, moving the rod toward the work at a speed of 200 to 600 inches per minute, maintaining a welding current density in the rod sufficient to produce a spray-type of metal transfer from the rod to the workpiece, and supplying a gas consisting of carbon dioxide at a rate of about 20 to 35 cubic feet per hour toward the workpiece to form a gaseous envelope about the arc and thereby exclude the surrounding atmosphere from the arc.

5. A method of arc welding, which comprises striking an arc between a workpiece and a killed steel consumable weldrod, feeding the weldrod toward the work at a rate of about 200 to 600 inches per minute, maintaining a welding current density in the rod of above 85,000 amperes per square inch to obtain a spray-type of metal transfer from the rod to the workpiece, and introducing a gas consisting of carbon dioxide at a rate of flow of 15 to 50 cubic feet per hour concentric with the weldrod toward the work to envelop the arc and exclude the surrounding atmosphere from the weld.

References Cited in the file of this patent

UNITED STATES PATENTS

| | | |
|---|---|---|
| 2,504,867 | Muller | Apr. 18, 1950 |
| 2,504,868 | Muller et al. | Apr. 18, 1950 |
| 2,544,711 | Mikhalapov | Mar. 13, 1951 |
| 2,621,278 | Muller | Dec. 9, 1952 |

FOREIGN PATENTS

| | | |
|---|---|---|
| 482,792 | Canada | Apr. 29, 1955 |
| 527,009 | Belgium | Sept. 6, 1954 |

OTHER REFERENCES

Abridgement of "Stability of the Welding Arc" by P. Alexander, February 1928, pp. 109–112.